(12) United States Patent
Kessels et al.

(10) Patent No.: US 7,487,300 B2
(45) Date of Patent: Feb. 3, 2009

(54) DATA PROCESSING CIRCUIT WITH MULTIPLEXED MEMORY

(75) Inventors: Jozef Laurentius Wilhelmus Kessels, Eindhoven (NL); Ivan Andrejic, Horgen (CH)

(73) Assignee: NXP B.V., Eindhoven (NL)

( * ) Notice: Subject to any disclaimer, the term of this patent is extended or adjusted under 35 U.S.C. 154(b) by 603 days.

(21) Appl. No.: 10/560,450

(22) PCT Filed: Jun. 9, 2004

(86) PCT No.: PCT/IB2004/050871

§ 371 (c)(1),
(2), (4) Date: Dec. 13, 2005

(87) PCT Pub. No.: WO2004/111860

PCT Pub. Date: Dec. 23, 2004

(65) Prior Publication Data

US 2006/0168416 A1    Jul. 27, 2006

(30) Foreign Application Priority Data

Jun. 16, 2003   (EP) .................................. 03101749

(51) Int. Cl.
*G06F 13/14* (2006.01)
(52) U.S. Cl. ........................... 711/150; 711/167; 710/45
(58) Field of Classification Search ................. 711/150, 711/167; 710/45
See application file for complete search history.

(56) References Cited

U.S. PATENT DOCUMENTS

| | | | |
|---|---|---|---|
| 5,202,973 A | 4/1993 | Ho et al. | |
| 5,706,482 A | 1/1998 | Matsushima et al. | |
| 6,412,049 B1 | 6/2002 | Pawlowski et al. | |
| 6,775,717 B1 * | 8/2004 | Tang et al. | 710/22 |
| 6,847,650 B1 * | 1/2005 | Stone et al. | 370/431 |
| 2002/0083287 A1 * | 6/2002 | Zumkehr et al. | 711/167 |
| 2004/0003194 A1 * | 1/2004 | Bodas et al. | 711/167 |

OTHER PUBLICATIONS

Implementing a 128Kx32 Dual-Port RAM Using the Flash370, Dec. 1995, Cypress Semiconductor Corporation, pp. 1-11.*

* cited by examiner

*Primary Examiner*—Kevin L Ellis
*Assistant Examiner*—Jared I Rutz (57) ABSTRACT

A data processing apparatus contains several processing circuits each operating under control of its own periodic clock signal, so that the clock signals may have different frequencies and/or can be autonomous. The several processing circuits each have an output for outputting memory access requests, which remain at the output for a validity duration interval defined by the clock signal of the particular processor. A multiplexing circuit multiplexes the access requests to a memory. The memory needs a minimum memory repetition period before it can accept an access request following acceptance of a preceding access request. The clock periods of the processing circuits are longer than the minimum memory repetition period. A timing circuit selects acceptance time points at which each particular access request from a first data processing circuit is accepted. The time point at which the particular request is accepted is always within the validity duration interval in which the particular access request is made. The timing circuit varies the position of the acceptance time points within the validity duration intervals, so that the position is delayed to make room for previously accepting an access request from another processor. The position is subsequently moved back toward a start of the validity duration interval in successive steps during application of successive access requests from the first data processing circuit.

12 Claims, 5 Drawing Sheets

DATA PROCESSING CIRCUIT WITH MULTIPLEXED MEMORY

The invention relates to an apparatus in which processes executed by different circuits access the same single port memory circuit.

In theory a multiport memory would be the ideal solution for allowing different circuits independent access to the same memory circuit. In practice, however, real multiport memories are not favored, because they involve considerable overhead compared with conventional single port memories. Therefore, a single port memory is often used to realize a pseudo multi-port memory.

From U.S. Pat. No. 5,706,482 an apparatus is known with a pseudo multi-port memory that comprises a single port memory circuit for storing image data. A first circuit that executes a write process and a second circuit that executes a read process both have access to the memory. A FIFO write queue is provided between the memory port and the first circuit and a FIFO read queue is provided between the memory port and the second circuit. An arbiter circuit allows data to be read from memory when the FIFO read queue underflows. Otherwise the FIFO write queue is granted access to execute buffered write commands from the first circuit. The memory is accessed at a higher frequency than the frequency of read and write accesses by the first and second circuit. U.S. Pat. No. 5,706,482 specifies that the memory write and read speed should be at least twice the writing speed of data into the write buffer and the reading speed of data out of the read buffer respectively.

A high memory speed is disadvantageous. It results in high power consumption and it imposes limits on the operating speed of the apparatus.

Among others, it is an object of the invention to provide for an apparatus with a single port memory and at least two circuits that access the memory independently in which a lower memory access speed can be used.

Among others, it is a further object of the invention that the circuits that access the memory can operate each under control of their own substantially periodic clock signal, without suspending execution for a clock cycle to wait during memory access by other circuits.

Among others, it is a further object of the invention to reduce the required access speed when at least two of the circuits that access the memory have mutually different clock periods.

Among others, it is another object of the invention to provide for an apparatus with a single port memory and at least two circuits that access the memory independently in which no multiposition FIFO queue is used.

The apparatus according to the invention is set forth in claim 1. In the apparatus a timing circuit realizes a variable phase delay between the periodic start times of validity intervals in which a first processing circuit outputs access requests (containing e.g. memory addresses) and acceptance of the access requests in the validity interval (accepting a memory access request as used herein only means that the memory circuit starts handling the request in a way that the request need no longer be maintained). Handling an access request from a second processing circuit increases the phase delay before a next request can be accepted. However, such an access request from the second processing circuit is handled only when the resulting increased phase delay for the first data processing circuit remains within the validity interval. In subsequent validity periods the phase delay is reduced in successive steps, until the delay in a particular period of validity lies at least one minimum memory repetition period before the end of the particular validity interval. By permitting a variable phase delay the speed requirements imposed on the memory access speed are reduced.

Because the phase delay remains within the validity interval of the requests the requests from the first data processing circuit can always be captured within the validity interval during which they are output by the first data processing circuit. There is no need to make the first data processing circuit pause for an operation cycle to wait for acceptance of a request. Accordingly, in an embodiment a single register is used to capture request information, without using a FIFO for buffering a number of requests that may increase to two or more requests. The register may even be shared for successively storing requests from both data processing circuits, since requests from the first data processing circuit always remain valid until after requests from the second data processing circuits can be discarded.

In an embodiment the timing circuit comprises respective clocking circuits for periodically clocking operation of the first and second processing circuits, so that a sum of the frequencies at which new access request are made available (or can be made available except for processing dependent reasons) is less than the inverse of the minimum memory repetition period. Thus, it is ensured that all access requests from periodically clocked processing circuits are handled and that the second processing circuit only makes access requests when they can be handled sufficiently early, so that handling finishes before the end of a clock period of the first data processing circuit in which a subsequent access request has been made.

In an embodiment the timing circuit comprises an asynchronous arbitration circuit. Each processing circuit outputs access requests (containing among others a memory addresses) at periodic start times (clock ticks) and the arbitration circuit sequences conflicts. Once the memory can accept a request, the arbitration circuit accepts the first made request first. If both processing circuits have made access requests simultaneously, the arbitration circuit decides in which order the accesses are accepted.

In an embodiment the variable delay is realized by introducing a self-timed activity that repeatedly first receives a request via the arbitration circuit from one of the processing circuits and then performs the required memory access. This self-timed activity generates a third clock (timing) signal for accessing the memory, so that the memory accesses have variable phase shifts with respect to the processing clocks (accepting a memory access request as used herein only means that the self-timed circuit has copied the request in a buffer register). In this way, when all requests have to be serviced, the memory speed requirement is reduced to: the performance of the memory should not be less than the sum of the access rates of the processing circuits. Note that this only imposes a lower speed requirement on memory with respect to prior art solutions if the access rates of the different processing circuits differ.

By including the arbiter before the self timed activity delays introduced by the arbiter do not contribute to the minimum memory repetition period. This reduces the speed requirements imposed on the memory.

If both processing circuits request to access the memory simultaneously, and the request of the fastest processing circuit is handled last, then this request is accepted after the memory access time, which is less than the clock period of the clock of the fastest processing circuit. During the time interval in which the access request from the fastest processing circuit is being handled by the self-timed activity the next access request from the fastest processor circuit can already occur. This second request is accepted with less delay relative to the clock time at which the request is offered than the previous one. In subsequent accesses the phase delay is reduced in successive steps, until either the delay is zero or the slow processing unit requests an access. By the time that the latter occurs, the delay between the clock and acceptance of a memory request in the fast processing unit has been reduced to such an extent that the time left after accepting a request and the next clock tick is at least the memory access time (and some timing overhead).

Accordingly, in an embodiment a single register in the self-timed activity is used to capture the access information, without using a FIFO for buffering a number of requests that may increase to two or more requests. Since the self-timed activity is behind the arbiter, the register is shared for successively storing requests from both data processing circuits.

The minimum memory repetition period does not need to be much higher than the time interval between successive requests from the fast processing circuit. If no request from a processing circuit should be missed the sum of the access request frequencies of both processing circuits should be less than the inverse of the memory access time. When the access frequency of one of processing circuit is less than that of the other, the required memory access speed is therefore less than twice that of the fast processing circuit. Typically when the access frequency of the slow data processing circuit is one tenth of that of the fast data processing circuit, the memory speed needs to be only a ten percent higher than the speed of the fast processing circuit.

A data register may be provided for receiving read data from the memory in response to read requests. When read requests are generated only at a low frequency the read data needs to be refreshed at a low rate, so that it can be processed by one or more of the processing circuits without special timing requirements. In particular, when only the second data processing circuit produces read requests at a frequency lower than the request frequency of the first data processing circuit it is ensured that the read data will be available within a fixed delay for use by the second data processing circuit.

In an embodiment the read and write data width differ, read data (for the second data processing circuit) containing a multiple of write words (from the first data processing circuit). Thus a high data rate can be realized with a low request rate from the second data processing circuit, permitting a minimum memory repetition frequency that is only slightly above the request frequency of the fast data processing circuit.

The memory can be made up of banks that are arranged at successive geometrical positions along a row in an integrated circuit. In that case the wire delays will significantly contribute to the access time, which consists of sum of the memory access time and the wire delays. The reduction of the access frequency by these wire delays can be alleviated by performing the accesses to the different memory banks in a pipeline with successive stages coupled to respective ones of the memory banks. Preferably, each memory bank has a self-timed activity which repeatedly first receives an access request from its predecessor in the pipeline and then passes this request on to its successor while performing an access to its bank if this is required. In such an embodiment the performance of the memory is limited, if at all, by the wire delays between two neighboring memory banks instead of the delays of wires running along all successive banks.

These and other objects and advantageous aspects of the apparatus according to the invention will become apparent from the following figures and their description.

Figure 1:
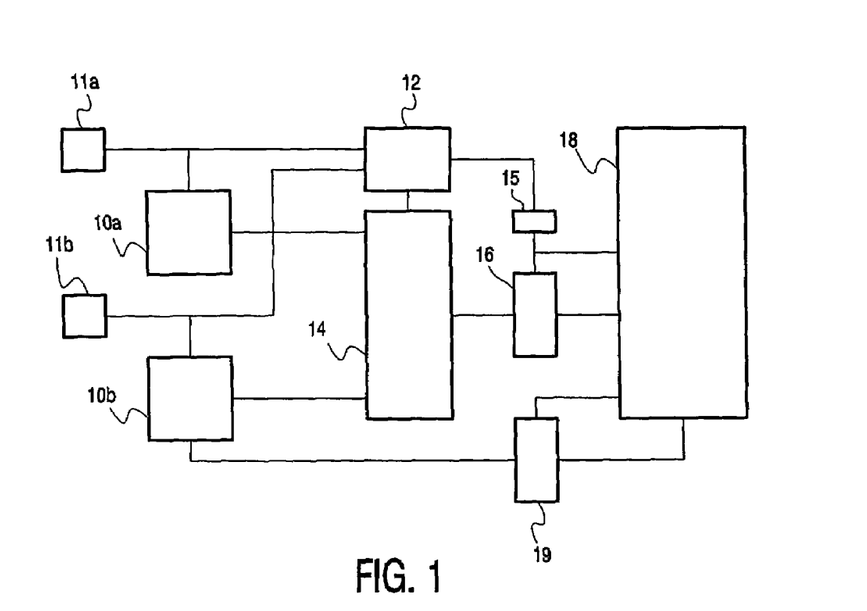
FIG. 1 shows a circuit with a memory and circuits for two processes.

FIG. 1 shows a circuit with a first data processing circuit 10a, a second data processing circuit 10b, a first clock circuit 11a, a second clock circuit 11b, a selector circuit 12, a multiplexer 14, a synchronization circuit 15, a register 16, a memory 18 and a data register 19. First clock circuit 11a is coupled to first data processing circuit 10a and selector circuit 12. Second clock circuit 11b is coupled to second data processing circuit 10b and selector circuit 12. First and second data processing circuits 10a,b have access request information outputs coupled to inputs of multiplexer 14, which in turn has an output coupled to an input of register 16. Selector circuit 12 has a selection output coupled to a control input of multiplexer 14 and a timing control output coupled to synchronization circuit 15. Synchronization circuit 15 has a timing output coupled to register 16 and memory 18. Data register 19 has inputs coupled to memory 18 and an output coupled to second data processing circuit 10b.

In display driver application memory 18 stores image information, such as pixel data, and second data processing circuit is a display control circuit that controls pixel content on a display screen (not shown) dependent on data read from memory 18 ("data processing" as understood herein includes, but is not limited to, controlling information on a display screen). In this application first data processing circuit 10b is for example a processor that computes the pixel data, a receiver circuit or a camera processor. First data processing circuit 10a writes the pixel data to memory 18 so that it can be read later by second processing circuit 10b. The access request information from data processing circuits 10a,b contains for example an address for addressing a location in memory 18, a control bit to enable/disable access, a read/write control bit and optional data. However, it should be realized that the invention is not limited to such requests. For example, memory may contain an address counter for updating an address for use with requests from one of the data processing circuits 10a,b. In this case, no address needs to be supplied in the access request information from that data processing circuit. Other information may be supplied by default. In the extreme all access request information could be supplied by default, as long as it is indicated that the request comes from a particular data processing circuit 10a,b for which defaults are available.

In operation, timing of the circuit is controlled by the combination of clock circuits 11a,b and selector circuit 12. First and second data processing circuits 10a,b operate in cycles determined by their respective clock circuits 11a,b. Each data processing circuit 10a,b is able to produce new access request information in each of its particular cycles. Multiplexer 14 passes the access request information from a selected one of the data processing circuits 10a,b to register 16, where the access request information is latched. (A conventional multiplexing circuit may be used, such as a bus type circuit wherein one of the inputs is conductively connected to the output). Register 16 passes the latched information to memory 18, which accesses a memory location under control of the access request information. In case of a write request accompanied with an address and data, memory 18 stores the data into the location addressed by the address. In case of a read request accompanied by an address memory 18 reads data from the addressed location and causes the data to be latched in data register 19. Selector circuit 12 determines from which data processing circuit 10a,b access request information is latched in register 16. Selector circuit 12 triggers synchronization circuit 15 which determines when the access request information is latched and when a memory access cycle using the latched access request information is started.

The cycle repetition rate of first and second data processing circuit 10a,b can differ substantially, for example by a factor of ten. In an example first processing circuit 10a has a cycle duration during which valid access request information is supplied of P1=100 nsec (F1=1/P1) and second processing circuit 10b has a corresponding duration of P2=1000 nsec CF2=1/P2). Memory 18 may be accessed with a variably selectable period between successive accesses. The minimum duration of a memory access cycle Pm is the sum of the memory access time (Macc), wire delays (Wdel) and the timing overhead introduced by the control circuit (Cdel). Therefore Pm=Macc+Wdel+Cdel. The maximum access frequency of the memory Fm is the inverse of the memory access Fm=1/Pm. The frequencies F1, F2 should be such that the maximum memory frequency Fm is higher than the sum F1+F2 of the frequencies of the first and second data processing circuit 10a,b. In the example of frequencies of F1=10 Mhz and F2=1 Mz for example, a memory frequency of at least 11 Mhz is required.

When it is known that first data processing circuit 10a does not issue new access requests in all of its cycles, but only in a fraction k of its cycle (k=⅔ for example) then the condition can be relaxed even further to $$Fm>k*F1+F2$$

which accounts for the need to process only k*F1 access requests from first data processing circuit 10a.

Selector circuit 12 selects access request information from slow data processing circuit 10b to be copied to register 16 as soon as possible after slow data processing circuit 10b makes the access request information available. This means that selection of access request information from fast data processing circuit 10a is delayed at this time.

Figure 2:
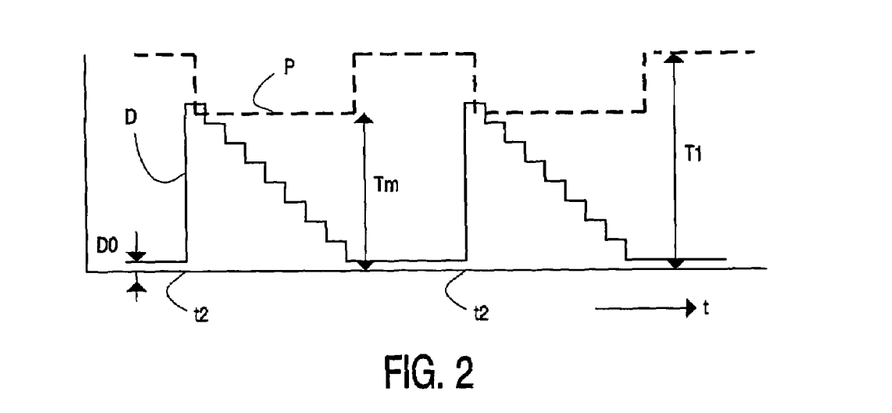
FIG. 2 shows access period duration and delay as a function of time.

FIG. 2 shows the delay D between the time fast data processing circuit 10a makes access request information available and the time that the access request information is copied into register 16 as a function of time. In addition the figure shows the actual duration P between successive cycles initiated by synchronization circuit 15, to trigger copying into register 16 and to trigger a memory access cycle. (It may be noted that delays and durations are defined only per cycle, but for the sake of clarity continuous graphs have been drawn).

It is seen that initially the delay D has a small value D0 and the repetition period of memory access cycles P is equal to the duration T1 of a repetition cycle of first data processing circuit 10a. At instants t2 where access request information from second data processing circuit 10b is selected the delay D increases by an amount Tm equal to a minimum length memory access cycle. Subsequently, the length of the repetition period of memory access cycles P drops to the minimum length Tm for a number of access cycles. This causes the delay D to decrease by the difference T1−Tm after each access cycle until the original small delay D0 is reached. After that the repetition period Tm of the memory access cycles is increased to the cycle duration T1 of first data processing circuit 10a.

It should be noted that the worst case delay D is less than the cycle duration of first data processing circuit 10a in the sense that access request information that is available after the initial delay D0 is still available after the additional delay D0+Tm, because the access cycle starts with a delay D0 after the access control information becomes available and because T1>Tm. The selection of the cycle frequencies Fm>F1+F2 ensures that the delay D is reduced to D0 before a next cycle of second data processing circuit 10b starts and causes the delay to increase. In this way it is ensured that data there is no need to make first data processing circuit 10a wait for access to memory, or for an additional buffer to buffer the access request information from first data processing circuit 10a.

It should also be noted that, as will be described, memory access may be pipelined. In this case the duration Pm does not correspond to the full time needed for memory access, but only to the duration of a processing the request in a single pipeline stage. When Pm is determined by the initial pipeline stage (or when this is the only stage) it includes the duration for processing in this stage, plus the memory access time, plus wire delays.

Figure 3:
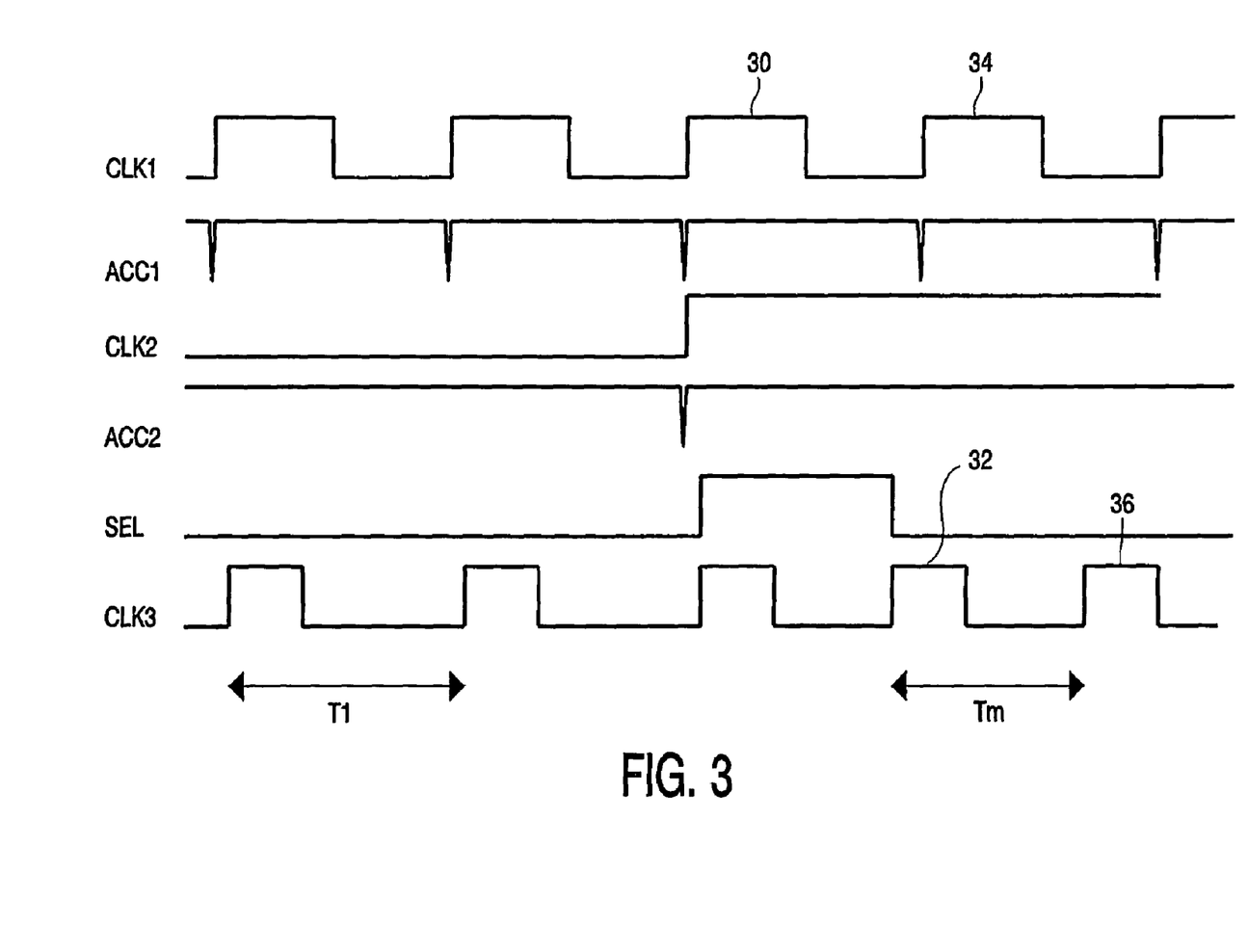
FIG. 3 shows signals involved in the circuit of FIG. 1.

FIG. 3 shows timing of the various cycles. Traces CLK1 and CLK2 show clock signals from first and second clock circuit 11a,b, traces ACC1, ACC2 show access request events. Trace SEL shows a selection signal from selector circuit 12 and trace CLK3 shows memory cycle trigger pulses.

Initially a situation with small delay D0 of FIG. 2 holds. Access request information from first data processing circuit 10a is selected. In response to the first two clock pulses in CLK1 pulses in CLK3 are almost immediately generated to load the access request information into register 16 and to subsequently process the access request under control of the loaded access request information. Thus the delay between the pulses in CLK3 is equal the cycle duration T1 of CLK1 at this time.

The start of a third clock pulse 30 in CLK1 arrives simultaneously with the start of a clock pulse in CLK2 (this is a worst case situation; the clock pulses need not be coincide). Now the selection circuit selects the access information from second data processing circuit 10b and a pulse in CLK3 is almost immediately generated in response to the pulse in CLK2 to load the access request information into register 16.

Subsequently the selection SEL is turned back to the first data processing circuit 10a and, as soon as allowable in view of the speed of the speed of the memory circuit, a pulse 32 is generated in CLK3 to load the access request information corresponding to pulse 30 in CLK1 into register 16 and to start the memory access cycle. It should be noted that, although pulse 32 has a much larger delay with respect to pulse 30 than the corresponding delay for earlier pulses in CLK1, the delay is still less than the time interval until first data processing circuit 10a changes the access request information ACC1 in correspondence with the next pulse 34. In response to the next pulse 34 in CLK1 a pulse 36 is generated in CLK3 as soon as a new memory access cycle can start, that is after a time interval Tm and so on. Thus, the delay between pulses in CLK1 and corresponding pulses in CLK3 is gradually reduced.

It may be noted that the time needed to change the access request information ACC1 should be so short that the delay caused by devoting one cycle to second data processing circuit 10b does not cause the access request information to be loaded during the change. However, the time interval in which the access request information is changed is very small (for example less than 0.5 nsec), so that this does not significantly affect the maximum allowable delay at a cycle frequency of 10 MHz.

It may also be noted that FIG. 3 shows a worst case situation where the start of a third clock pulse 30 in CLK1 arrives simultaneously with the start of a clock pulse in CLK2. If the start of the clock pulse in CLK2 precedes the start of the clock pulse of first data processing circuit 10a, the access request from second processing circuit 10b is also handled immediately, provided that the preceding access request from first data processing circuit 10a has been handled. But in this case handling of the request from second data processing circuit 10b finishes earlier in the clock cycle of first data processing circuit 10a, so that more time is left in the clock cycle than shown in FIG. 3. If the start of the clock pulse in CLK2 is later than the start of the clock pulse of first data processing circuit 10a, the access request from first data processing circuit 10a is handled first. In this case handling of the request from second data processing circuit 10b starts as soon as the access request from first data processing circuit 10a has been handled, and continues if need be into the next clock cycle of first data processing circuit 10a. As a result either handling of the access request from first data processing circuit 10a in the next clock cycle need not be delayed at all, or more time is left in the next clock cycle than shown in FIG. 3.

It will be appreciated that in an embodiment data processing circuits 10a,b need not request access in each of their clock cycles. If so, the clock signals applied to selector circuit 12 may be disabled in those cycles in which no request is made. Thus, the increase in delay D is reduced more quickly in case of a disabled access request from first data processing circuit 10a, or an increase in the delay D is prevented in case of a disabled access from second data processing circuit 10b.

No data needs to be returned from memory 18 when both data processing circuits 10a,b only write data. Data register 19 is provided for the case that slow (second) data processing circuit 10b generates read requests. In case of a read access memory 18 sends the data that has been read and a load signal when read data is available to data register 19. The circuit has the effect that read data is always available at least from a predetermined time Tm+Am after the corresponding access request, allowing for a delay Am to read the data and a maximum delay Tm to finish access for an access cycle previous to the read cycle. It may be noted that the duration of a (pipeline step of a) memory read cycle may differ from a memory write cycle. In this case duration of the memory the read cycle should be so short that the delay until the access request information ACC1 is changed is longer than the memory read cycle. Because the clock of second data processing circuit 10b is much slower the read data will be loaded only after it has been loaded into data register 19.

When access requests from data processing circuits 10a,b are synchronized the read data is available in a predetermined time interval Da-Db after the access request. In this case data register 19 may be omitted, or timed from second data processing circuit 10b.

When both data processing circuits can issue read requests, a data register 19 is preferably provided for each, and loaded according to the source of the read request (for example under control of a delayed SEL signal).

Figure 4:
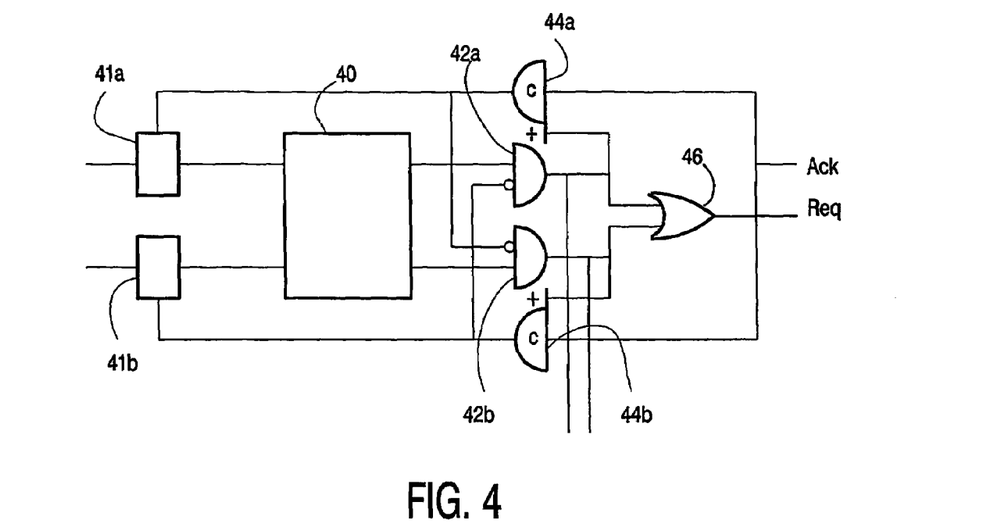
FIG. 4 shows part of a timing circuit.

FIG. 4 shows an embodiment of a partial circuit of the selector circuit. The circuit has inputs for coupling to clock circuits 11a,b (not shown) and a handshake interface REQ, ACK for coupling to synchronization circuit 15 (not shown). The circuit contains an asynchronous arbiter 40 (mutual exclusion element), a pair of clock flip-flops 41a,b, a pair of AND gates 42a,b an pair of asymmetric Muller C-elements 44a,b and an OR gate 46. Arbiter 40 which is of a type known per se, that raises the output corresponding to an input where the input signal is raised, with the exclusion that at most one output is kept high at a time. Muller C-elements 44a,b are also known per se, and are of a type that raise their output signal if all their input signals are logic high and lower the output signal when the input not marked with a+ becomes low.

Outputs of clock circuits 11a,b (not shown) are coupled to clock inputs of clock flip-flops 41a,b which have outputs coupled to inputs of arbiter 40. Arbiter 40 has outputs coupled to first inputs of AND gates 42a,b respectively. AND gates 42a,b have outputs coupled to inputs of OR gate 46 and to +inputs of asymmetric Muller C-elements 44a,b. Muller C-elements 44a,b have outputs coupled to inverting inputs of AND gates 42a,b and to reset inputs of clock flip-flops 41a,b. The ACK input of the asynchronous interface is coupled to symmetric inputs of Muller C-elements 44a,b. The output of OR gate 46 is coupled to the REQ output of the asynchronous interface. The outputs of AND gates 42a,b are used to control multiplexer 14 (not shown).

In operation when one of the clock circuits 11a,b raises its output signal, the output of the corresponding flipflop 41a,b goes high. As soon as at least one of its inputs is high, arbiter 40 raises the corresponding output. AND gates 42a passes this rise, producing signals to control multiplexer which are used to select the access request information. OR gate 46 generates a raised handshake request signal REQ in response to the raised output of AND gate 42a When this request is acknowledged through incoming signal ACK Muller C-element 44a resets clock flip-flop 41a, on which the arbiter will respond by making its input to AND gate 42a low. As a result OR gate 46 lowers the REQ signal. In reply the ACK signal is lowered, after which the circuit is ready for a next cycle. Note that as soon as the arbiter has made its output to AND gate 42a low, it can immediately accept a waiting request from data processing circuit 10b. However as long as the previous memory handshake has not been completed, the output of Muller C-element 44a is high which prevents the output of AND gate 42b to become high. In this way the two sequences of accesses are merged while preventing two memory accesses from different sources to overlap.

In a typical embodiment synchronization circuit 15 is of a type known per se which has handshake interfaces to selector circuit 12 and memory 18. In response to a request signal from selector circuit synchronization circuit 15 asserts an acknowledge and causes register 16 to load access request data When the data is loaded and the request has been deasserted synchronization circuit 15 deasserts the acknowledge. Once the access request data is loaded in register 16 synchronization circuit 15 initiates a handshake with memory 18. Once this handshake has been completed synchronization circuit 15 is ready to acknowledge a next request from selector circuit 12.

Figure 4A:
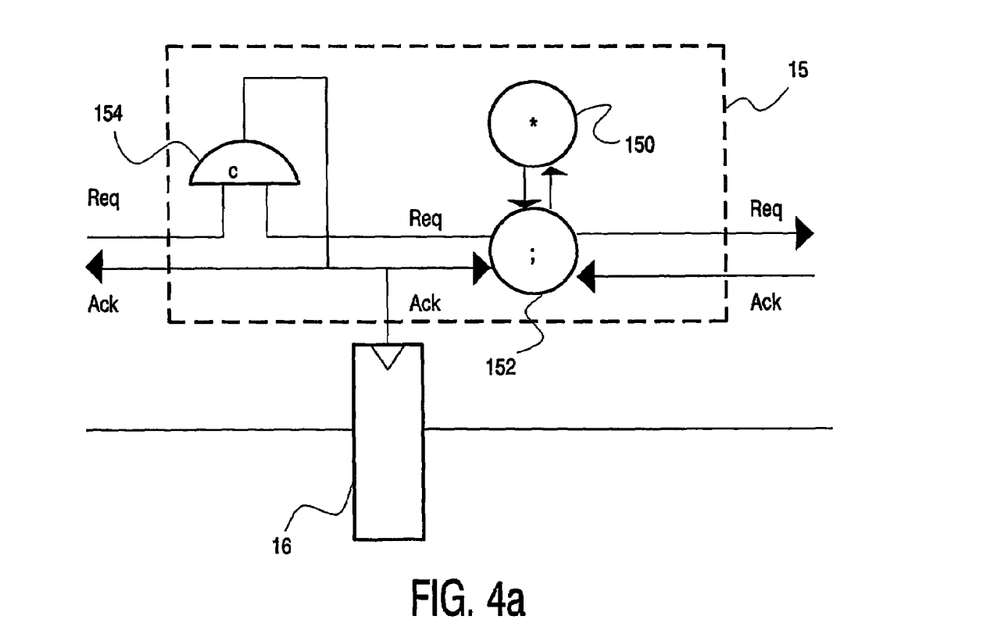
FIG. 4a shows another part of a timing circuit.

FIG. 4a schematically shows a typical embodiment of synchronization circuit 15, which uses handshake signals. In this embodiment synchronization circuit 15 contains a repeater circuit 150, a sequencing circuit 152 and a Muller C element 154. Repeater circuits 150 and sequencing circuits 152 are standard asynchronous circuit components that for which implementations are known per se. For the sake of clarity these circuit components have been drawn symbolically. A request input from selector circuit 12 (not shown) and a first request output from sequencing circuit 152 are coupled to inputs of Muller C-element 154. Muller C element 154 has an output coupled to an acknowledge input of selector circuit 12, a first acknowledge input of sequencing circuit 152 and a clock input of register 16. A second request output and acknowledge input of sequencing circuit 152 are coupled to memory 18 (not shown). A second request output and acknowledge input of sequencing circuit 152 are coupled to repeater circuit 150.

In operation a request signal from selector circuit 12 is handled when sequencing circuit 152 also outputs a request signal. In this case the request information is clocked into register 16 and the requests are acknowledged to selector circuit 12 and sequencing circuit 152. In response sequencing circuit 152 sends a request signal to memory 18, which then performs a memory access with the access information stored in register 16. As soon as the memory access is completed, the memory sends an acknowledge signal back. The sequencer 152 then sends an acknowledge signal to repeater 150, which responds with a request signal that, in turn is passed to Muller C element 154.

When selector circuit 12 sends a request signal before the sequencing circuit has sent a new request signal, Muller C-element 154 does not respond until sequencing circuit has sent a new request signal. Thus, clocking of register 16 and sensing a request to memory 18 is delayed until at least a minimum memory access period has passed since the start of the previous memory access.

In many applications, such as for instance mobile display divers, the memory consists of several memory banks. The memory banks are then often arranged sequentially over a long geographical distance, for example at locations corresponding to different pixel ranges on a display. These long geographical distances lead to large wire delays (Wdel) and consequently to low memory frequency Fm. This problem can be circumvented by pipelining the memory access requests.

Figure 5:
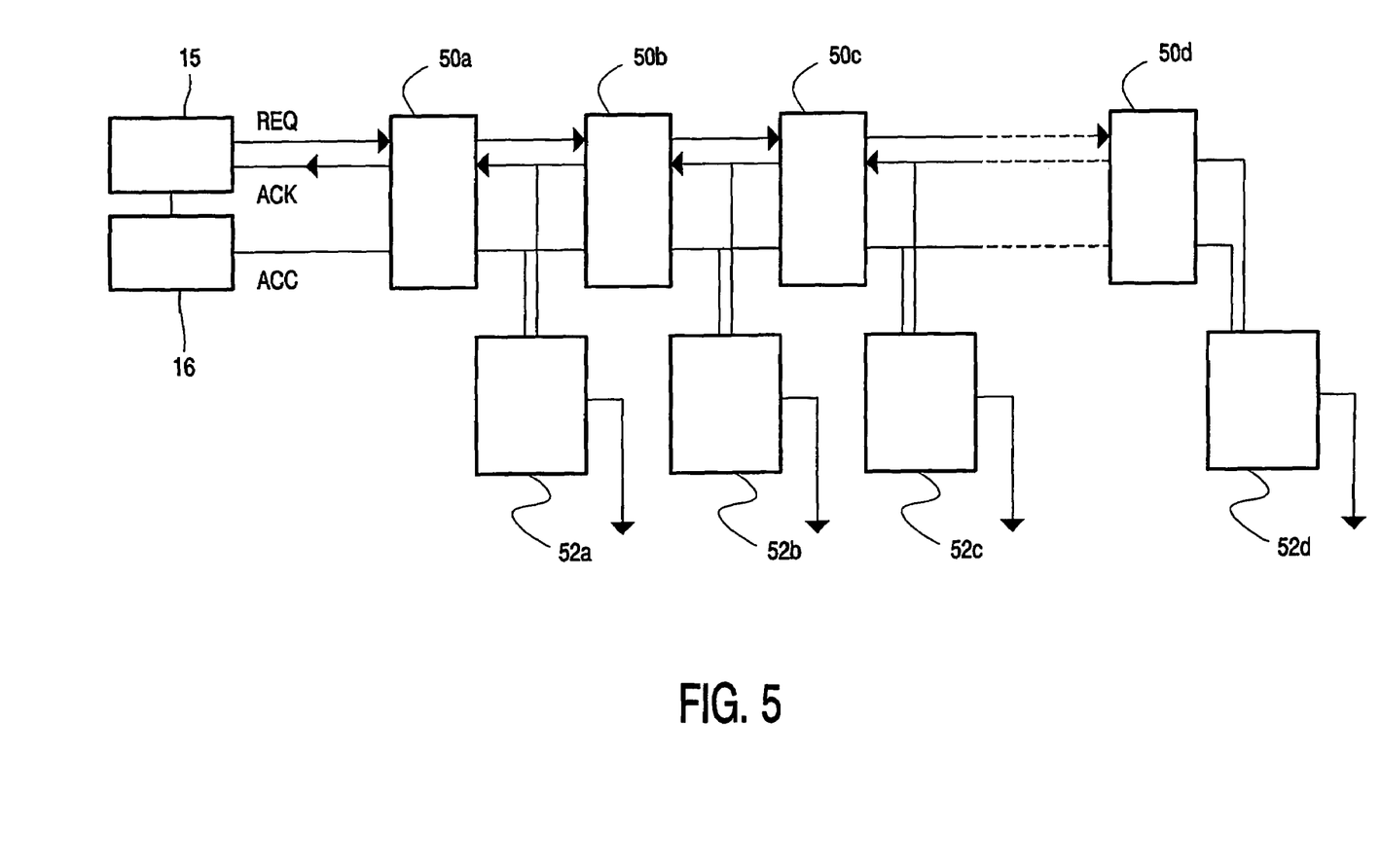
FIG. 5 shows a memory architecture.

FIG. 5 shows an example of such a memory circuit for use in the circuit of FIG. 1. The circuit contains a number of memory banks 52a-d and a number of synchronization circuits 50a-d. The synchronization circuits 50a-d are arranged as stages in a pipeline, which passes the access request information from register 16. The first stage in this pipeline has a handshake interface to synchronization circuit 15. In addition handshake interfaces are provided between pairs of successive stages in the pipeline. The synchronization circuits have outputs coupled to memory banks 52a-d.

In operation synchronization circuits 50a-d each repeatedly first receive and latch access request information from its left neighbor then apply this information to its associated memory bank while passing the information to its right neighbor. The request to receive the access request information is acknowledged as soon as possible once the access request information has been stored, after which the access request information (e.g. an address, r/w control and optionally write data) is applied to the corresponding memory bank. A next request is accepted only if the bank has processed the access request information and the information is passed to its right neighbor.

It will be appreciated that the architecture of FIG. 5 serves to minimize the length Tm of the memory access cycle by reducing the effect of wire delays between to two communicating circuits, permitting a high memory frequency Fm. This in turn allows high cycle frequency for data processing circuits 10a,b. It will also be appreciated that other forms of pipelining may be used in the memory and that no pipelining is needed if the memory has a sufficiently fast cycle time without pipelining.

In an embodiment, read data from banks 52a-d is output in parallel in response to a read request. In this embodiment the read data from each bank is preferably latched in a respective corresponding data register (not shown) when the relevant bank has produced the data. In this way very read words from the memory are wider than write, words, which is useful for example for displays where very wide words (e.g. image lines) are needed at a low frequency.

Although the circuit has been described in terms of handshaking interfaces, it will be appreciated that instead of the handshaking interfaces one-sided trigger interfaces may be used. For example synchronization circuit 15 could be arranged to trigger a pulse of minimum duration upon reception of a request and be ready to accept a new request at the end of the pulse. The pulse may used to trigger memory 18 and register 16. When it can be guaranteed that the triggered circuits respond sufficiently quickly to be ready when the next trigger pulse arrives no handshake is needed. A handshake, however, has the advantage that it is compositional in that the submodules in a system can be designed without knowledge of the speeds of the other submodules. Similarly, a handshake interface towards clock circuits 11a,b may be used instead of the pulse interface described in the context of the figures. In this embodiment clock circuits 11a,b delay the next pulse of the clock by an amount sufficient for the relevant data processing circuit 10a,b to produce the next access request information and start the next cycle when the request is acknowledged. Thus, the clock frequency that clock circuits 11a,b apply to data processing circuits 10a,b may be adjusted. However, it should be noted that in this embodiment the first clock circuit 11a for the fast (first) data processing circuit 10a only adapts its frequency. It does not need to need to make a sudden large phase jump of the size of a memory cycle when a memory cycle is inserted for the second data processing circuit 10b. Similarly, instead of asynchronous interfaces synchronous interfaces may be used, for example by deriving clock signals from clock circuits 11a,b from a common clock source, e.g. by dividing a higher frequency clock by different frequency division ratio's, or by phase locking one of the clock circuits to the other.

In this case, control pulses for register 16 and memory 18 may also be derived from a clock that is synchronized to the other clocks circuit. For example, if clocks 11a,b run synchronized at frequencies N1*F0 and N2*F0 respectively then a clock for register 16 could be made to run at N1*F0 when there is no delay and at (N1+N2)*F0 upon receiving an access request from second data processing circuit 10b until the delay has been caught up.

Instead of dividers or locked clocks one may also use a clock multiplexer for providing a clock to memory 18, which passes a signal from a separate clock of memory 18 or from first clock circuit 11a of first processing circuit. In this embodiment the separate clock is started upon an access request from second processing circuit 10b and runs at a frequency above that of first clock circuit 11a. The signal from the separate clock is passed after granting an access request from second processor 10b at least until the separate clock has gained so much on the clock signal of first clock circuit 11a that it starts in the early part of the period of the first clock circuit 11a which is more than a minimum memory access period before the end of the period of first clock circuit 11a.

It will be appreciated that the architecture allows a single register 16 to be used to buffer all information between data processing circuits 10a,b and memory, but of course more registers may be used.

Figure 6:
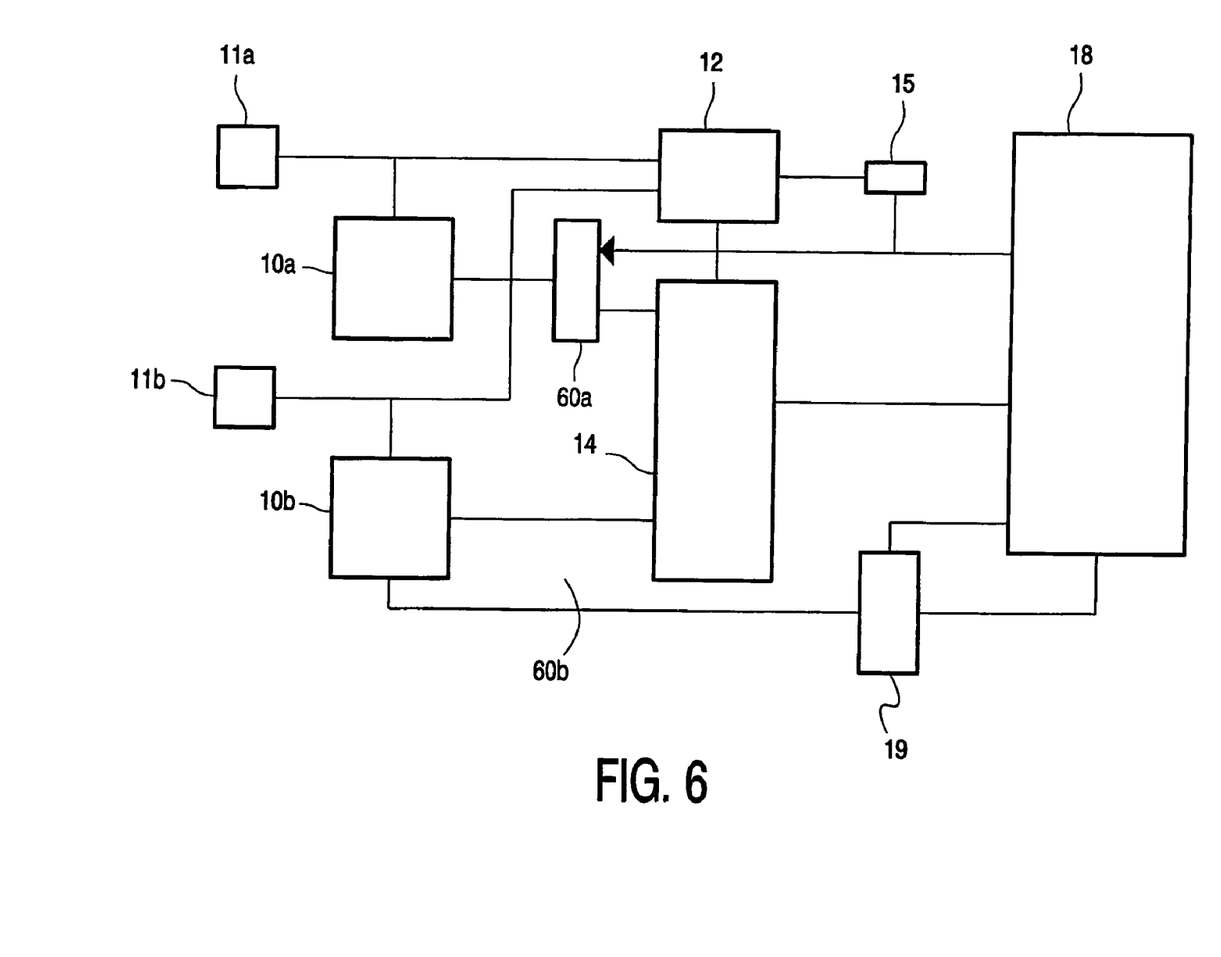
FIG. 6 shows an alternative circuit with a memory.

FIG. 6 illustrates an embodiment in which a register 60a is used between the first data processing circuit 10a and multiplexer 14 instead of register 16. Register 60a can be loaded at substantially the same time as register 16 of FIG. 1 (however, loading may be omitted at time points when access is accepted from the second data processing circuit 10b). No register is necessary for second data processing circuit 10*b* when T2, the duration when access request information from second data processing circuit 10*b* is longer than 2*Tm, the worst case delay until the access request information has been processed by memory 18.

Although the invention has been described for access request information that is supplied in parallel from a data processing circuit, it will be appreciated that, without deviating from the invention this information may be supplied partly, or wholly serially as long as this does not lead to violation of the timing constraint.

Similarly, it should be appreciated that more than two data processing circuits 10*a,b*, each with their own output for periodically producing access request information at its own frequency, may be coupled to register 16 via multiplexer 14. For example, several fast data processing circuit and one slow data processing circuit may be used if the sum of the access frequencies does not exceed the memory access frequency. In another example one fast data processing circuit and several slow data processing circuits may be used.

In general, if there are N data processing circuits and if N−1 times the minimum memory cycle duration fits into the cycle duration of any one of the processors the circuit ensures that access request information will be captured by register before the end of the cycle duration even if another processing circuit is granted access first, provided that the sum of the frequencies is less than the inverse of the minimum memory cycle length.

The invention claimed is:

1. A data processing apparatus, comprising
   a first and second data processing circuit, each with an output for outputting memory access requests, at least the first data processing circuit outputting respective access requests each during a respective validity duration interval;
   a multiplexing circuit with inputs coupled to the outputs of the first and second data processing circuits;
   a memory circuit with an input for accepting the access requests successively from an output of the multiplexing circuit, each at least after a minimum memory repetition period following acceptance of a preceding access request;
   a timing circuit coupled to the first and second data processing circuit and the memory circuit, and arranged to time operation of the first and second processing circuit each substantially periodically, so that the validity duration intervals are substantially periodical with a longer period than the minimum memory repetition period, the timing circuit being arranged to select acceptance time points at which each particular access request from the first data processing circuit is accepted within the validity duration interval in which this particular access request is made, the timing circuit varying a position of the acceptance time points within the validity duration intervals, so that the position is delayed within the validity duration interval to make room for previously accepting an access request passed by the multiplexing circuit from the second data processing circuit and the position is moved toward a start of the validity duration interval in successive steps during application of successive access requests from the first data processing circuit within subsequent periods of validity.

2. A data processing circuit according to claim 1, wherein the timing circuit comprises first and second clocking circuits coupled to clock inputs of the first and second data processing circuit respectively, whereby the access requests, if made, are replaced by the first and second data processing circuit at a first and second frequency of the first and second clocking circuit respectively, the sum of the first and second frequency being smaller than the inverse of the minimum memory repetition period.

3. A data processing circuit according to claim 2, wherein the timing circuit comprises an asynchronous arbiter circuit with inputs coupled to the first and second clocking circuit and an output coupled to a control input of the multiplexing circuit, the arbiter circuit being arranged to control from which of the first and second data processing circuit the multiplexing circuit will pass the access request, the arbiter circuit selecting among the data processing circuits on a first come first served basis of transitions in clock signals of the first and second data processing circuit.

4. A data processing circuit according to claim 3, comprising an asynchronous timer circuit with a trigger input coupled to asynchronous arbiter circuit and arranged to generate a timing signal for accessing the memory, the asynchronous timer circuit triggering a memory access cycle each time when asynchronous arbiter circuit selects a request and a previous minimum memory repetition period has finished.

5. A data processing circuit according to claim 1, the memory circuit comprising a register and a storage unit, the register coupled between the first data processing circuit and the storage unit, for latching access request information from at least the first data processing circuit for use by the storage unit under control of the timing circuit, upon the delay determined by the timing circuit.

6. A data processing circuit according to claim 1, wherein the memory circuit comprises a series of successively coupled pipeline stages, for executing successive steps in response to an access request, the minimum memory repetition period corresponding to a time interval needed by one of the pipeline stages to execute one of the steps.

7. A data processing circuit according to claim 6, wherein the memory circuit comprises memory banks, each coupled to a respective one of the pipe-line stages, for processing each of the requests successively in different ones of the banks.

8. A data processing circuit according to claim 7, wherein the banks are arranged at successive positions along a spatial row on an integrated circuit, with read data outputs for outputting data read in response to read requests among the requests at successive positions along the row, the second data processing circuit comprising display driver circuits, coupled to the outputs.

9. A data processing circuit according to claim 1, comprising a data register coupled between the memory circuit and the second data processing circuit, for copying read data read from the memory circuit in response to read requests among the requests and for supplying the read data to the second data processing circuit during handling of access requests of the first data processing circuit.

10. A data processing circuit according to claim 9, wherein the memory circuit comprises a plurality of banks with a first data word length, write requests among the requests comprising bank selection information and write data of the first data word length, the data register having a second data word length for receiving data from a plurality of the banks in parallel in response to each read request.

11. A data processing circuit according to claim 1, wherein the second data processing circuit comprises display drivers for processing read data from the memory by driving a content of a display device dependent on the read data.

12. A method of processing data the method comprising
    providing a memory circuit capable of accepting successive access requests each time after a minimum memory repetition period;

generating access request signals at a first and second output of a plurality of data processing circuits, access requests remaining each time for a validity duration interval at the first output, the validity duration interval being larger than the minimum memory repetition period;

time-multiplexing access requests from the first and second output to the memory circuit;

controlling a delay between the start of the validity duration intervals in which the first output outputs the access requests and acceptance of the access requests from the periods of validity, the delay being reduced in successive steps during application of successive access requests from the first output, until the delay in a particular period of validity lies at least one minimum memory repetition period before the end of the particular period of validity;

subsequently causing acceptance of at least one of the access requests from the second output, increasing the delay before a next access request of the first data processing circuit is accepted within the period of validity in which this next access request remains at the output.

* * * * *